United States Patent
Liu et al.

(10) Patent No.: US 7,697,274 B2
(45) Date of Patent: Apr. 13, 2010

(54) INPUT DEVICE AND METHOD FOR MENU CONTROL ON A PORTABLE COMPUTING DEVICE

(75) Inventors: Robert Han Liu, Guangdong (CN); Kuan-Hong Hsieh, Guangdong (CN); Xiao-Guang Li, Guangdong (CN); Han-Che Wang, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 680 days.

(21) Appl. No.: 11/561,862

(22) Filed: Nov. 20, 2006

(65) Prior Publication Data

US 2007/0162851 A1   Jul. 12, 2007

(30) Foreign Application Priority Data

Jan. 10, 2006   (CN)   .................. 2006 1 0032902

(51) Int. Cl.
   *G06F 1/16* (2006.01)
(52) U.S. Cl. ............. 361/679.27; 345/173; 348/222.01; 235/472.01
(58) Field of Classification Search ............. 345/156, 345/160, 173; 463/36; 455/574; 348/333.01, 348/222.01, 252, 745; 235/360, 472.01; 361/679.06, 679.27, 679.29, 679.61
See application file for complete search history.

(56) References Cited

U.S. PATENT DOCUMENTS

| | | |
|---|---|---|
| 2004/0147225 A1 | 7/2004 | Chen |
| 2005/0145774 A1 | 7/2005 | Yang |
| 2005/0181756 A1 | 8/2005 | Lin |
| 2006/0196345 A1 | 9/2006 | Arai |
| 2006/0217829 A1 | 9/2006 | Umezawa et al. |
| 2007/0149282 A1* | 6/2007 | Lu et al. ................. 463/36 |
| 2007/0164992 A1* | 7/2007 | Liu et al. ................ 345/156 |
| 2007/0211037 A1* | 9/2007 | Sun ...................... 345/173 |

FOREIGN PATENT DOCUMENTS

CN   2586215 Y   11/2003

* cited by examiner

*Primary Examiner*—Hung V Duong
(74) *Attorney, Agent, or Firm*—Winston Hsu

(57) ABSTRACT

An auxiliary input device for menu control on a portable computing device is provided. The auxiliary input device includes a lighting unit, an optical lens, and an optical sensor. The lighting unit is for projecting light to a surface upon which the portable computing device is moved upon. The optical lens is for receiving reflected light from the surface and focusing the reflected light on the optical sensor. The optical sensor is for periodically capturing images of the reflected light and transmitting information of the images captured to the portable computing device. The images captured map a movement of the portable computing device. Accordingly, the portable computing device scrolls through a menu displayed thereon according to the images captured. A related method is also provided.

10 Claims, 4 Drawing Sheets

US 7,697,274 B2

INPUT DEVICE AND METHOD FOR MENU CONTROL ON A PORTABLE COMPUTING DEVICE

BACKGROUND

1. Technical Field

The present invention relates to input devices and methods for a portable computing device, and particularly to an input device and method for menu control based on a movement of a portable computing device.

2. General Background

People commonly use portable computing devices today for various personal and work-related purposes. Such portable devices are, for example, mobile phones, personal digital assistants (PDA's), media players (e.g., MP3 players), and digital cameras. Portable devices are increasingly popular because their small size allows people to easily carry and use the devices in remote locations.

Another aspect, there exist today many conventional styles of input devices for performing operations with respect to these portable computing devices. By way of example, the input devices may include buttons, switches, keyboards, touch pads, touch screens, and the like. With respect to buttons, switches, or keyboards (hereinafter, "first type input devices"), they are generally dedicated to moving a selector (e.g., a cursor) in a specific direction (e.g., arrow keys) or to making specific selections (e.g., enter, delete, etc.). However, due to the mechanical structure of the first type input devices, they can no longer be accurately manipulated when over time mechanical components thereof wear out or simply break down. With respect to touch pads or touch screens (hereinafter, "second type input devices"), they are operable to move a selector in an appropriate direction or make a selection in an appropriate portion of these touch devices. However, due to the sensitive nature of the second type input devices, they are easy to be scratched or damaged so that operational inputs thereon may become ineffective.

What is needed, therefore, is an auxiliary input device and method for aiding selection control on the portable computing device.

SUMMARY

A portable computing device is provided. The device includes a screen, an optical sensing module, and a microcontroller. The screen is for displaying information including a menu. The optical sensing module is for capturing images which map a movement of the portable computing device. The microcontroller is connected to the screen and the optical sensing module. The microcontroller includes a displacement calculating module and a menu controlling module. The displacement calculating module is for obtaining a direction data and a distance data of the movement of the portable computing device according to the images captured. The menu controlling module is for scrolling through the menu displayed on the screen according to the direction data and the distance data obtained.

A method for controlling a menu displayed on a portable computing device is also provided. The method includes the steps of: (a) capturing images which map a movement of the portable computing device; (b) obtaining a direction data and a distance data of the movement of the portable computing device according to the images captured; and (c) scrolling through the menu displayed on the portable computing device according to the direction data and the distance data obtained.

Other advantages and novel features will be drawn from the following detailed description with reference to the attached drawing, in which:

DETAILED DESCRIPTION OF THE EMBODIMENT

Figure 1:
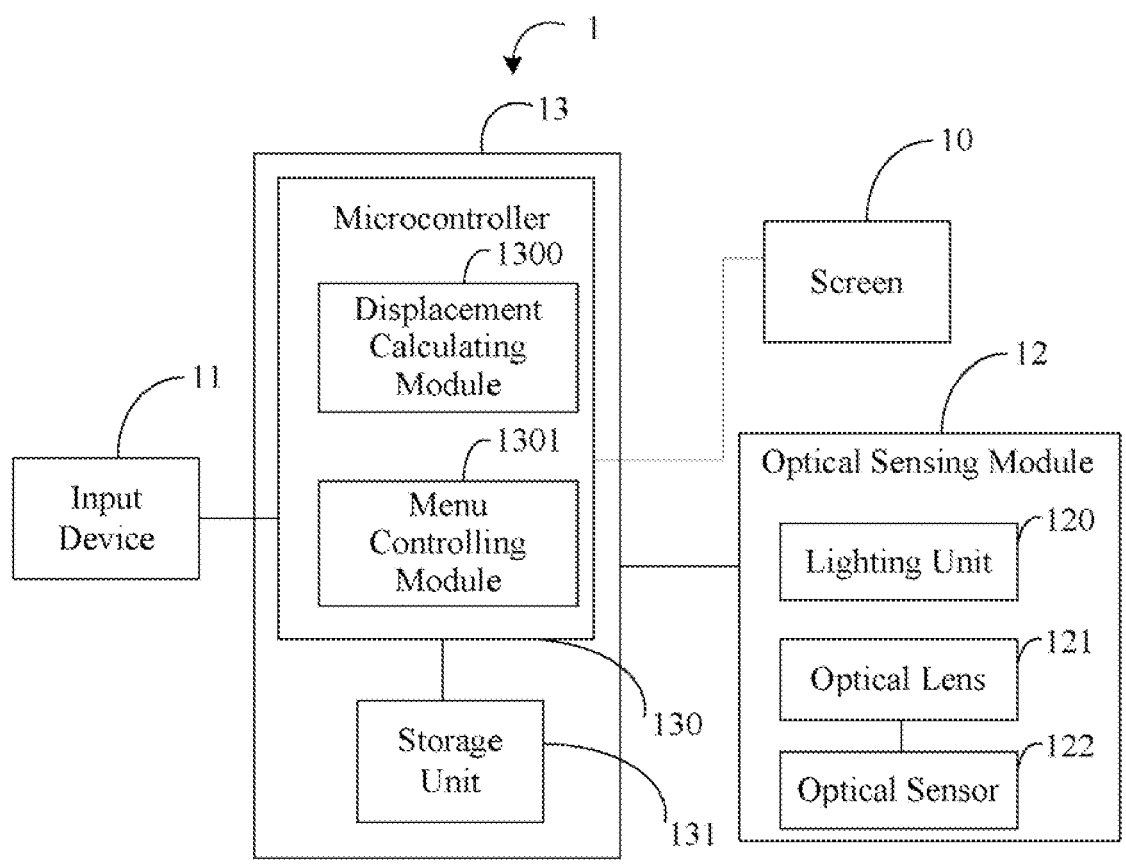
FIG. 1 is a schematic diagram of a hardware infrastructure of a portable computing device configured with an optical sensing module in accordance with a preferred embodiment of the present invention.

FIG. 1 is a schematic diagram of a hardware infrastructure of a portable computing device in accordance with a preferred embodiment of the present invention. The portable computing device 1 can be a media player, a mobile phone, a personal digital assistant, and the like. For brevity sake, the media player is described hereinafter as an example. The media player is configured for processing media (e.g., audio) files and may be pocket-sized. The media player 1 (as shown in FIG. 1) includes a screen 10, an input device 11, an optical sensing module 12, and a main body 13.

The input device 11 described herein is in a form of buttons as an example. The buttons include, but not limited thereto, a play/pause button, a forward button, a backward button, and a mode button. Furthermore, these buttons have similar functions as that of conventional media players (e.g., MP3 players).

The optical sensing module 12 is configured at the back of the screen 10, and includes a lighting unit 120, an optical lens 121, and an optical sensor 122. The lighting unit 120 can be any appropriate type of luminous body, such as a light emitting diode (LED), a laser diode, and the like.

The main body 13 includes a microcontroller 130 and a storage unit 131. The storage unit 131 is for storing information, such as audio files, audio menus (e.g., playlists), and so on. The microcontroller 130 includes a displacement calculating module 1300, and a menu controlling module 1301.

When the media player 1 is powered on, the menu controlling module 1302 reads a playlist of the media files from the storage unit 131 and displays a current subset of the playlist on the screen 10. When the media player is moved along a surface (e.g., a desktop workspace), the lighting unit 120 (e.g., LED) projects light to the surface, the optical lens 121 receives reflected light from the surface and focuses the reflected light on the optical sensor 122. The optical sensor 122 periodically captures images of the reflected light and transmits information of the images captured to the microcontroller 130.

After receiving the information of the images captured, the displacement calculating module 1300 compares the information of a current image with that of a previous image to obtain direction data and distance data of the movement of the media player 1. The displacement calculating module 1300 further transmits the direction data and the distance data to the menu controlling module 1301. The menu controlling module 1301 displays a resulting subset in relation to the current subset according to the direction data and the distance data obtained. The resulting subset of the playlist when displayed right after the current subset of the playlist may appear as though that the playlist is being scrolled.

Additionally, when displaying other audio menus, the media player 1 has a similar control mechanism as that on the playlist.

By utilizing the optical sensing module 12, a user of the media player 1 can simply move the media player 1 along the surface (e.g., desktop workspace) to scroll through a menu (e.g., playlist), thereby quickly displaying desired menu items (e.g., list items). With the optical sensing module 12, scrolling through the menu is no longer solely dependent on the forward and/or backward buttons to scroll through the menu, thus, an operation frequency on buttons relating to a scroll operation is decreased, thereby prolonging work life of these buttons. In other words, the optical sensing module 12 can be regarded as an additional input device for menu control on the media player 1.

Figure 2:
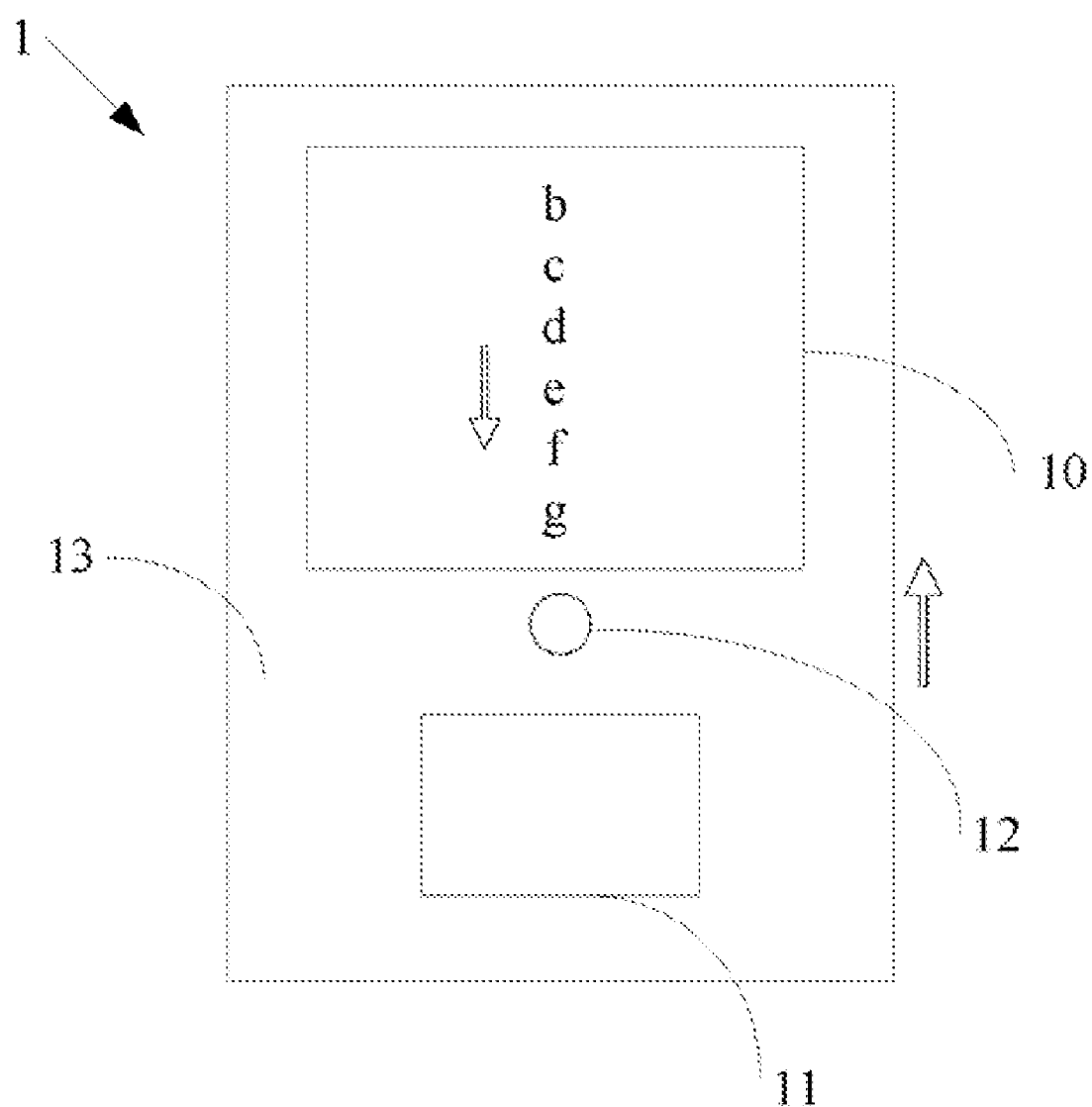
FIG. 2 is a schematic diagram showing a list control based on a movement of the portable computing device of FIG. 1.

FIG. 2 is a schematic diagram showing a list control based on the movement of the media player 1. The scroll direction of the menu displayed can be in the same direction as the media player 1 moves or in the different direction as the media player 1 moves. In one embodiment as shown in FIG. 2, when the media player 1 moves upwards, the menu (e.g., playlist) scrolls downwards.

Figure 3:
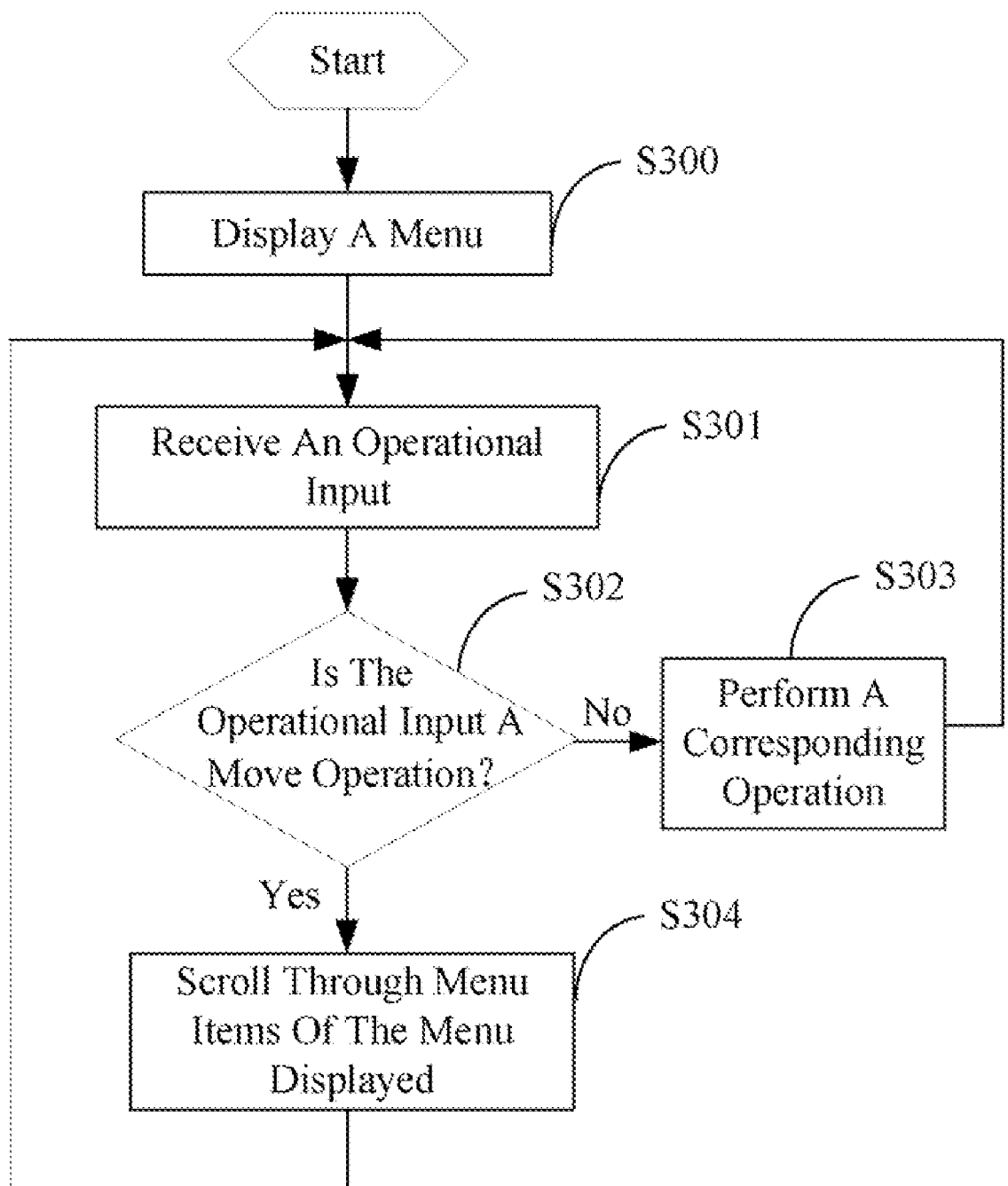
FIG. 3 is a flowchart of a preferred method for controlling the list of FIG. 2 by the portable computing device of FIG. 1.

FIG. 3 is a flowchart of a preferred method for controlling the list of FIG. 2 by the media player 1. In step S300, as the media player 1 is powered on, the menu controlling module 1301 reads the playlist from the storage unit 10, and displays the subset of the playlist on the screen 10.

In step S301, the menu controlling module 1301 receives an operational input from the input device (either the conventional input device 1 or the additional input device 12).

In step S302, the menu controlling module 1301 determines whether the operational input received is from the optical sensing module 12.

If the operational input is from the input device 1, in step S303, the microcontroller 130 performs a corresponding function according to the operational input, such as power on, power off, pause, volume adjustment, and the like.

If the operational input is from the optical sensing module 12, that is the operational input is a movement of the media player 1 on a surface, in step S304, the menu controlling module 1301 displays the resulting subset of the playlist based on the current subset of the playlist being displayed according to the movement of the media player 1.

Figure 4:
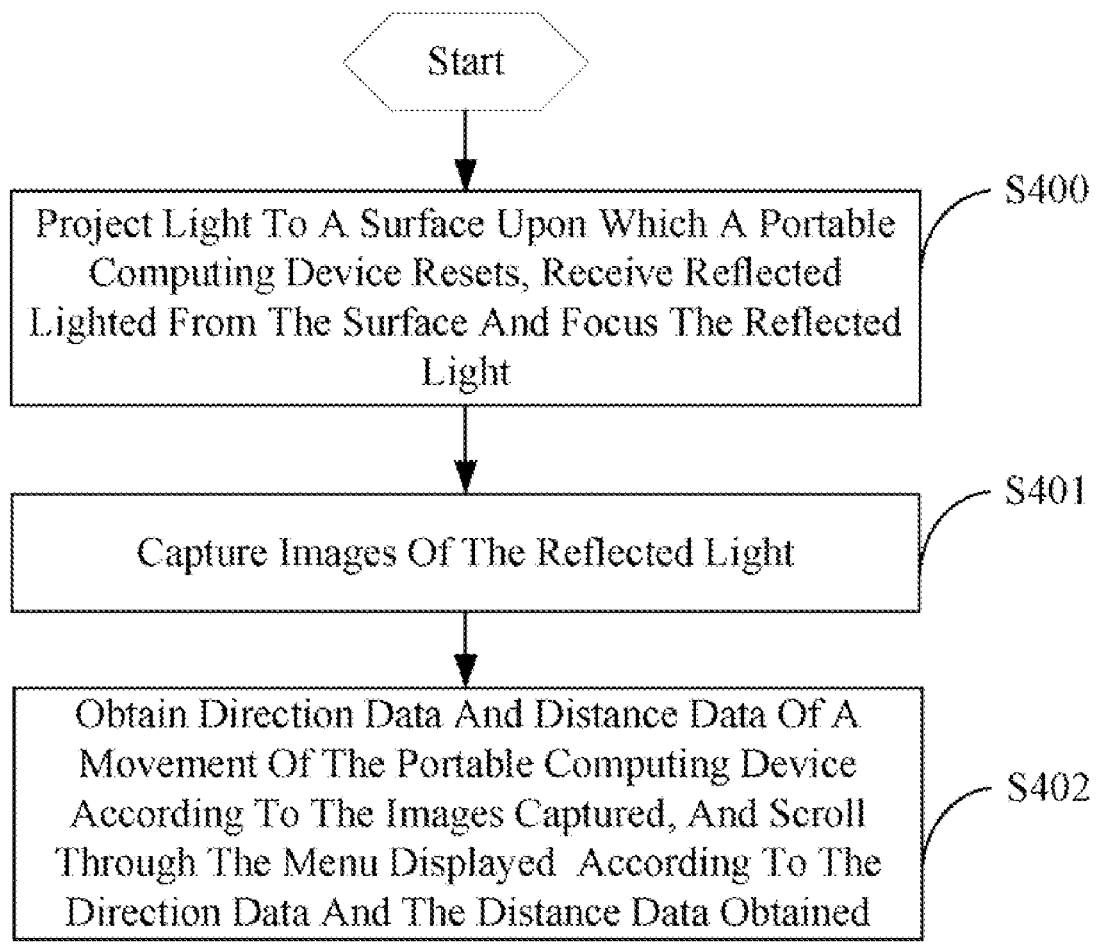
FIG. 4 is a flowchart of a preferred method for implementing one step of FIG. 3, namely scrolling list items of the list of the FIG. 2.

FIG. 4 is a flowchart of a preferred method for implementing step S304 of FIG. 3, namely scrolling list items of the list of the FIG. 2. In step S400, the LED 120 projects light to the surface that the media player 1 is moved upon, and the optical lens 121 receives the reflected light from the surface and focuses the reflected light on the optical sensor 122.

In step S401, the optical sensor 122 periodically captures the images of the reflected light and transmits the information of the images captured to the displacement calculating module 1300.

In step S402, the displacement calculating module 1300 compares the information of the current image with that of the previous image to obtain the direction data and the distance data of the movement of the media player 1, and transmits the direction data and the distance data obtained to the menu controlling module 1301 so as to select the resulting subset of the playlist to be displayed such that when displayed right after the current subset of the playlist, is perceived that the playlist is being scrolled.

Although the present invention has been specifically described on the basis of a preferred embodiment and preferred method thereof, the invention is not to be construed as being limited thereto. Various changes or modifications may be made to the embodiment and method without departing from the scope and spirit of the invention.

What is claimed is:

1. A portable computing device comprising:
    a screen, for displaying information which includes a menu;
    an optical sensing module, for capturing images which map a movement of the portable computing device; and
    a microcontroller connected to the screen and the optical sensing module, comprising:
        a displacement calculating module, for obtaining a direction data and a distance data of the movement according to the images captured; and
        a menu controlling module, for scrolling through the menu displayed on the screen according to the direction data and the distance data obtained.

2. The device according to claim 1, wherein the optical sensing module further comprises a lighting unit, an optical lens, and an optical sensor, the lighting unit being configured for projecting light to a surface upon which the device is moved upon, the optical lens being configured for receiving reflected light from the surface and focusing the reflected light on the optical sensor, and the optical sensor being configured for periodically capturing images of the reflected light and transmitting information of the images captured to the displacement calculating module.

3. The device according to claim 2, wherein the displacement calculating module compares the information of a current image with that of a previous image to obtain the direction data and the distance data of the movement of the device.

4. The device according to claim 1, wherein the portable computing device is a pocket-sized media player.

5. The device according to claim 4, wherein the menu is a list of media items.

6. The device according to claim 1, wherein when the portable computing device moves upwards, the microcontroller controls the menu to scroll downwards.

7. A method for controlling a menu displayed on a portable computing device, the method comprising the steps of:
    capturing images which map a movement of the portable computing device;
    obtaining a direction data and a distance data of the movement according to the images captured; and
    scrolling through the menu displayed on the portable computing device according to the direction data and the distance data obtained.

8. The method according to claim 7, wherein the capturing step comprises the steps of:
    projecting light to a surface upon which the portable computing device is moved upon;
    receiving reflected lighted generated on the surface and focusing the reflected light; and
    periodically capturing images generated and focused by the reflected light.

9. The method according to claim 7, wherein the determining step comprises the step of: comparing a current image with a previous image to obtain the direction data and the distance data of the movement of the portable computing device.

10. The method according to claim 7, wherein the scrolling step comprises the step of:
    scrolling the menu downwards when the portable computing device moves upwards.

* * * * *